US012125061B2

(12) United States Patent
Sethuraman

(10) Patent No.: US 12,125,061 B2
(45) Date of Patent: Oct. 22, 2024

(54) CONTENT PRESENTATION BASED ON ACCESS POINT LOCATION

(71) Applicant: Fortinet, Inc., Sunnyvale, CA (US)

(72) Inventor: Keerthi K. Sethuraman, Sunnyvale, CA (US)

(73) Assignee: Fortinet, Inc., Sunnyvale, CA (US)

(*) Notice: Subject to any disclaimer, the term of this patent is extended or adjusted under 35 U.S.C. 154(b) by 752 days.

(21) Appl. No.: 14/717,091

(22) Filed: May 20, 2015

(65) Prior Publication Data
US 2016/0343029 A1    Nov. 24, 2016

(51) Int. Cl.
| | | |
|---|---|---|
| *G06Q 30/0273* | (2023.01) | |
| *G06Q 30/0241* | (2023.01) | |
| *G06Q 30/0242* | (2023.01) | |
| *G06Q 30/0251* | (2023.01) | |
| *G06Q 30/08* | (2012.01) | |
| *H04L 67/02* | (2022.01) | |
| *H04L 67/52* | (2022.01) | |
| *H04N 21/234* | (2011.01) | |
| *H04N 21/2543* | (2011.01) | |
| *H04N 21/262* | (2011.01) | |

(Continued)

(52) U.S. Cl.
CPC ..... *G06Q 30/0255* (2013.01); *G06Q 30/0267* (2013.01); *G06Q 30/0277* (2013.01); *H04L 67/02* (2013.01); *H04L 67/52* (2022.05)

(58) Field of Classification Search
None
See application file for complete search history.

(56) References Cited

U.S. PATENT DOCUMENTS

| | | | |
|---|---|---|---|
| 2004/0068668 A1* | 4/2004 | Lor | H04L 63/107 |
| | | | 726/15 |
| 2006/0212353 A1* | 9/2006 | Roslov | G06Q 30/02 |
| | | | 705/14.54 |

(Continued)

OTHER PUBLICATIONS

Author(s): Aimazahreh, Samer . Title: Wireless Access Point Specific. Journal: IEEE [online]. Publication date: 2013.[retrieved on: Nov. 10, 2021_ ]. Retrieved from the Internet: < URL:https://ieeexplore.ieee.org/stamp/stamp.jsp?tp=&arnumber=6578233> (Year: 2013).*

(Continued)

*Primary Examiner* — Bion A Shelden
*Assistant Examiner* — Alfred H Tsui
(74) *Attorney, Agent, or Firm* — Law Office of Dorian Cartwright; Dorian Cartwright

(57) ABSTRACT

Methods and systems for AP location based content presentation are provided. According to one embodiment, a web service receives from a widget executing within a web page requested by a wireless computing device of multiple wireless computing devices operating within an enterprise, a unique identifier of the wireless computing device. An access point (AP) identifier is determined for an AP of multiple APs of the enterprise that is servicing the wireless computing device by querying a log database with the unique identifier. AP specific content is displayed within the web page as a result of the web service retrieving the AP specific content from a content database based on the AP identifier and returning the AP specific content to the widget.

1 Claim, 10 Drawing Sheets

(51) Int. Cl.
*H04N 21/2665* (2011.01)
*H04N 21/81* (2011.01)

(56) References Cited

U.S. PATENT DOCUMENTS

| | | | | |
|---|---|---|---|---|
| 2006/0288072 A1* | 12/2006 | Knapp | G06Q 10/00 | 709/203 |
| 2008/0040219 A1* | 2/2008 | Kim | G06Q 30/02 | 705/14.26 |
| 2008/0220741 A1* | 9/2008 | Hung | H04W 12/06 | 455/411 |
| 2012/0260192 A1* | 10/2012 | Detweiler | G06Q 30/02 | 715/745 |
| 2013/0167196 A1* | 6/2013 | Spencer | H04W 8/22 | 726/3 |
| 2014/0006924 A1* | 1/2014 | Tsolis | G06F 16/972 | 715/234 |
| 2014/0195380 A1* | 7/2014 | Jamtgaard | G06Q 30/0601 | 709/224 |
| 2014/0257889 A1* | 9/2014 | Ashley, Jr. | G07C 11/00 | 705/7.11 |
| 2017/0034289 A1* | 2/2017 | Theobald | H04L 67/306 | |

OTHER PUBLICATIONS

Author(s): Azgin, A . Title: Mobility study for named data networking in wireless access networks. Journal: IEEE [online]. Publication date: 2014 .[retrieved on: Aug. 26, 2022_ ]. Retrieved from the Internet: < URL:https://ieeexplore.ieee.org/abstract/document/6883822> (Year: 2014).*

Author(s):Jackson, C. Title: Secure cross domain communication for web mashups Journal: ACM [online]. Publication date: 2007. [retrieved on: Mar. 10, 2023 ]. Retrieved from the Internet: < URL:https://dl.acm.org/doi/pdf/10.1145/1242572.1242655 > (Year: 2007).*

Author(s): Provos, N Title: All your iframes point to us Journal: USENIX [online]. Publication date: 2008.[retrieved on: Nov. 21, 2023]. Retrieved from the Internet: < URL:https://www.usenix.org/legacy/event/sec08/tech/full_papers/provos/provos.pdf> (Year: 2008).*

Author(s): Kroski Title: On the move with the mobile web Journal: RCLIS [online]. Publication date: 2008. [retrieved on: Jun. 1, 2024]. Retrieved from the Internet: < URL: http://eprints.rclis.org/12463/> (Year: 2008).*

\* cited by examiner

CONTENT PRESENTATION BASED ON ACCESS POINT LOCATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2015, Fortinet, Inc.

BACKGROUND

1. Field

Embodiments of the present invention generally relate to content presentation on a web page of a web browser. More particularly, embodiments of the present invention relate to real-time advertisement targeting based on information associated with an access point (AP) through which the user's mobile device is accessing the Internet.

2. Description of the Related Art

Existing web-based architectures enable advertisements to be presented on a web page based on the content/material of the web page and/or based on web browser history. For instance, if a web page requested by a web client relates to travel information, advertisements fetched by the publisher and presented on the page concurrently with the content may relate to various travel service providers. The contextual relevance of the advertiser's services/offers/deals with the content being viewed by the end user is thought to increase the likelihood of engaging the end user. This situation is not only specific to advertisements but also to any other supplemental content/information that the web page may be configured to present.

Online (Internet) advertisements have become ubiquitous and synonymous with browsing the Internet (on both traditional desktop computers as well as mobile browsing platforms, including, but not limited to, cellular devices, smartphones, wearable technology, tablets and the like) and mobile applications ("apps"). Often times, advertising is the primary revenue source for a website and/or app. The success of an online advertising campaign and the value of an advertising impression may vary depending on, among other factors, the location of the viewer, the demographic of the viewer and the context in which the ad is presented. Web site owners desire to maximize the revenue received from advertisers. Similarly, advertisers desire to obtain the highest percentage return/yield for their advertising expenditures.

However, at present, as content/browsed history of a web page forms the primary basis for determination of the advertisement/supplementary information to be presented on web pages, there is a strong likelihood that irrelevant advertisements are presented to users. Take, for example, the situation in which a user of a mobile device is in an electronic store and browses a news provider's web page showing foreign exchange news. Instead of showing advertisements relating to the electronic equipment(s) that the user may be intending to buy, existing web pages would likely display advertisements from forex service provides, brokerage firms, among other like entities that are identified by existing advertisement engines based on the content of the web page.

Worse yet, the electronics store consumer may perform comparative shopping while in an electronic store A, and search for a particular camera on web pages of competitive electronics stores or online market places. In this situation, existing advertisement engines may present advertisement(s) from other electronic stores say B-D, which may be competing with electronics store A. Such advertising content may lure the user away from electronics store A or otherwise decrease the likelihood of the user buying a product from electronics store A.

Therefore, in existing advertising architectures, targeted advertisements do not reflect the current mood, context and/or behavior of mobile users. For example, consider a user that is browsing a web page while in the waiting room of a hospital. As current advertisements displayed typically relate to the content of the web page and/or to the user's browsing history, assuming the user had at some time in the past performed a search for the best mortgage rate, the user may be presented with an advisement relating to credit unions and/or banks and their current mortgage rates. Given the user's current context, a waiting room of a hospital, such ads do not make sense and are unlikely to be effective.

Furthermore, most advertisement networks make use of browser cookies, which have questionable effectiveness in view of the ease of disabling and/or clearing such cookies. Additionally, it is difficult to use a cookie generated by one webpage for another webpage due to browser security. Hence, advertising networks must typically generate a cookie on first visit and the second visit will use the previous cookie to facilitate selection and display of advertising content to the user. This scenario creates missed opportunities as a user visiting a credit card web site for the first time may not be presented with relevant advertising, but may be presented with credit card related advertisements during a subsequent browsing session during which the user may be focused on other things. Additionally, conventional advertising models are reliant on the indexing of webpages, which takes time and storage space.

There is therefore a need in the art for systems and methods that enable implementation of engines and architectures that take alternative parameters into account, such as the current location of a user, the purpose that the user may intend fulfilling, the context of the situation, among other parameters before pushing advertisements/supplementary content to the user.

SUMMARY

Methods and systems are described for AP location based content presentation. According to one embodiment, a web service receives from a widget executing within a web page requested by a wireless computing device of multiple wireless computing devices operating within an enterprise, a unique identifier of the wireless computing device. An access point (AP) identifier is determined for an AP of multiple APs of the enterprise that is servicing the wireless computing device by querying a log database with the unique identifier. AP specific content is displayed within the web page as a result of the web service retrieving the AP specific content from a content database based on the AP identifier and returning the AP specific content to the widget.

Other features of embodiments of the present invention will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
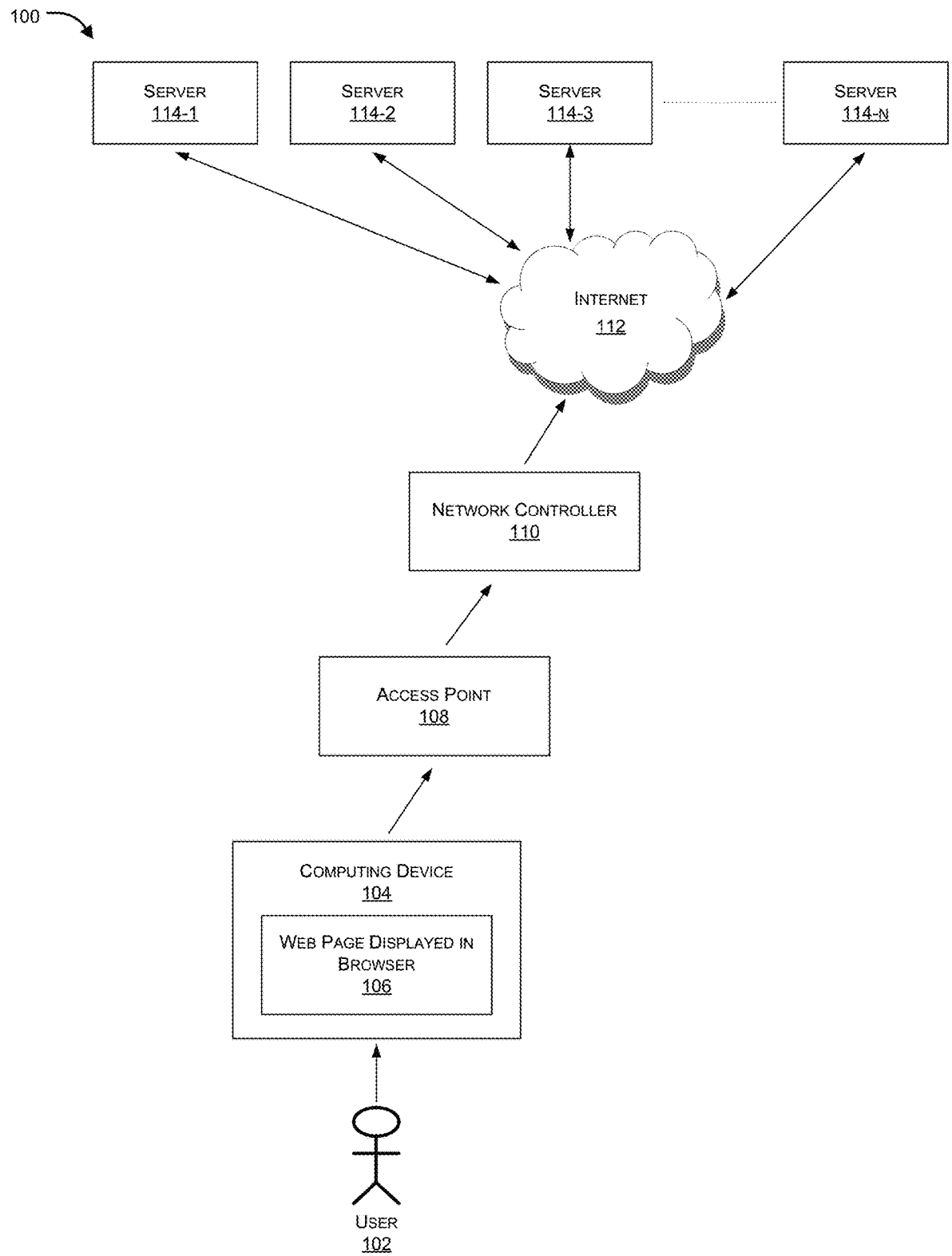
FIG. 1 illustrates an exemplary network architecture in which embodiments of the present invention can be implemented.

Methods and systems are described for AP location based content presentation. Embodiments of the present invention relate to real-time advertisement targeting based on information associated with an access point (AP) through which a user's mobile device is accessing the Internet. Aspects of the present disclosure include a system having an access point (AP) determination module that is configured to receive a unique identifier of a computing device and determine, based on the received unique identifier, an AP identifier of an AP that is currently servicing the computing device, and having an AP-based advertisement module that is configured to retrieve content that is specific to the AP, and send the retrieved content to the computing device for presentation on a web page. In an aspect, the unique identifier can be sent as part of a web service request, wherein the web service request can be initiated from the web page.

In the following description, numerous specific details are set forth in order to provide a thorough understanding of embodiments of the present disclosure. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of conducting network auditing, it should be appreciated that the same has been done merely to illustrate the disclosure in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named component/element.

Embodiments of the present invention generally relate to content presentation on a web page of a web browser, and more particularly to real-time advertisement targeting based on information associated with an access point (AP) through which the user's mobile device/computing device is accessing the Internet/network.

In an aspect, system of the present disclosure can include a web page widget execution module that is configured to execute a widget incorporated in a web page that is presented on a computing device. The system can further include a web service implementation module configured to call a web service based on execution of the widget, wherein the web service can be configured to receive a unique identifier of the computing device and pass the unique identifier as part of a request to a log. The system can further include a log-based access point (AP) determination module that is configured to enable the web service to, based on the log and the unique identifier, determine an AP identifier of an AP that is servicing the computing device. Furthermore, the system can include an AP-based advertisement module that is configured to enable the web service to retrieve content that is specific to the AP to be displayed on the web page.

In another aspect, the unique identifier can include an IP address, a MAC address, an International Mobile Equipment Identity (IMEI) number, a Mobile Equipment Identifier (MEID), a Cellular Data Number (CDN), an Integrated Circuit Card ID (ICCID) number or a serial number of the computing device. In another aspect, the AP specific content can include any of one or more advertisements, information, deals and coupons that an owner of a premises within which the AP is installed desires to be presented to users of computing devices that are being serviced by the AP, wherein, the AP specific content can be stored in a content database. In another aspect, the AP specific content can be configurable by a network administrator through a user interface.

In another aspect, the system can include a web server that can be configured to host the web service, wherein the web service can be called by any or a combination of the widget that is configured in the web page or by a third party, or a combination thereof.

In yet another aspect, the log can include a mapping between unique identifiers of computing devices and AP identifiers of APs servicing the computing devices that is created by a network controller and stored in a log database, wherein the web server can be operatively coupled with the log database and the content database. In an aspect, the log can be generated based on web-based actions that can be performed on the computing device. In another aspect, logs, including, but not limited to, syslogs (e.g., a syslog maintained by a syslog server configured to receive log messages from one or more APs or a network controller managing the APs), can be generated while a user is browsing the Internet and can be stored in a database that can, for instance, be specific to a particular user or customer, be used to identify an AP that is servicing requests on behalf of a specific wireless device and/or can be configured to have real-time read only access.

Aspects of the present disclosure can further include a method that implements the AP location based content delivery/presentation, and can include the steps of executing a widget incorporated in a web page that is presented on a computing device, and calling a web service based on execution of the widget, wherein the web service is configured to receive a unique identifier of the computing device and pass the received unique identifier as part of a request to a log. The method can further include the step of enabling the web service to, based on the log and the unique identifier, determine an access point (AP) identifier of an AP that is servicing the computing device. The method can further include the step of enabling the web service to retrieve content that is specific to the AP to be displayed on the web page.

Aspects of the present disclosure can further include a system having an access point (AP) determination module that is configured to receive a unique identifier of a computing device and determine, based on the received unique identifier, an AP identifier of an AP that is servicing the computing device, and having an AP-based advertisement module that is configured to retrieve content that is specific to the AP, and sending the retrieved content to the computing device for presentation on a web page. In an aspect, the unique identifier can be sent as part of a web service request, and wherein the web service request can be initiated from the web page.

Aspects of the present disclosure can further include a web server that can be configured to host a web service, wherein the web service can be called by a web page of a computing device, and wherein the web service can be configured to receive a unique identifier of the computing device and determine, based on the received unique identifier of the computing device and a log database, an access point (AP) identifier of an AP that is servicing the computing device, and wherein the web service can further be configured to retrieve content that is specific to the AP and send the retrieved content to the computing device for presentation on the web page. In an aspect, the web service can be called by means of a widget that is configured in the web page. In another aspect, the web server can be operatively coupled with a content database that is configured to store the content and operatively coupled with a log database that is configured to store mapping between the unique identifier and the AP identifier.

FIG. 1 illustrates an exemplary network architecture 100 in which embodiments of the present invention can be implemented. Those skilled in the art will appreciate that the exemplary architecture 100 is shown only for illustrative purposes, and that various alternative arrangements are possible and completely within the scope of the present disclosure. As shown, architecture 100 can include a user 102 that browses one or more web pages 106 in a browser such as Internet Explorer™, Google Safari™, Mozilla Firefox™ that is installed/configured in a computing device 104, including, but not limited to, a laptop, a mobile phone, a smartphone, a tablet PC or a wearable device. In an aspect, the computing device 104 can be operatively coupled with one or more access points (APs) 108, which in turn can be operatively coupled with a network controller 110 (e.g., a gateway device, a firewall, a router or other appropriate controller) such that resource requests (e.g., those for images, files, web pages, among others) made by user 102 via one or more web pages 106, for example, can be routed through the network controller 110 to Internet 112, which can then, based on the requested web resource, access the desired server from 114-1, 114-2, . . . , 114-n, which may be collectively referred to as server 114 hereinafter, fetch the requested resource and return same to computing device 104.

In an aspect, AP 108 (e.g., a wireless AP) is a network element that establishes connections with mobile client devices such as computing devices 104, wherein client devices 104 can include a piece of hardware referred to as a wireless network interface card that can allow client device 104 to establish a data connection with AP 108. Communication of data over a wireless connection can typically be done over radio waves. Other technologies such as infrared may be used as well, wherein the AP 108 can convert the data received over a wireless connection into a format to be transported over a wired network structure. A variety of protocols may be used including, but not limited to Bluetooth™ and the family of 802.11 standards from the Institute of Electrical and Electronics Engineers (IEEE).

Network architecture 100 can include network elements (e.g., routers, switches, and cables) that provide functionality to the network, wherein architecture 100 can also include a physical media providing connections between the network elements. Various types of cables may be used to provide connectivity including, but not limited to, Ethernet cables, coaxial cable, and fiber optical cables. Additionally, various wireless technologies may be used to connect two different network elements.

In another aspect, network server 114 may provide a number of different types of services to client devices 104 serviced by the network. For example, network server 114 may be a Dynamic Host Control Protocol (DHCP) server that assigns IP addresses to newly connected client devices, or can be a storage server that stores data accessible to client devices on the network, or can also perform certain processes for client devices 104 connected to network 100. In some cases, network server 114 may function as a RADIUS server that stores information that indicates which mobile client devices or users of those devices should be provided with access to a network.

In another aspect, network controller 110 is a network element that is responsible for managing the network, wherein network controller 110 may maintain a database of the physical and logical addresses for the various client devices and network elements of the network. Network controller 110 may also route network traffic to an external network (e.g., Internet 112). Network controller 110 may also communicate with network controllers for other networks to route traffic thereto. Some networks may be managed by more than one network controller.

According to one embodiment, computing device 104 and AP 108 can be configured as part of a wireless local area network (WLAN), wherein network controller 110 can be coupled with one or more APs 108 by means of a transport data network.

According to one embodiment, network controller 110 can be implemented by one or more general purpose computer systems (e.g., a Dell PowerEdge or a Hewlett-Packard ProLiant DL server). Each of network controller 110, APs 108, and client/computing devices 104 can include a microprocessor. The microprocessor can be any type of processor, such as, for example, any type of general purpose microprocessor or microcontroller, a digital signal processing (DSP) processor, an application-specific integrated circuit (ASIC), a programmable read-only memory (PROM), an erasable programmable read-only memory (EPROM), or the like. Each of network controller 110, APs 108, and client devices 104 can also include computer memory, such as, for example, random-access memory (RAM) or EEPROM/Flash. However, the computer memory of the network controller 110 can be any type of computer memory or any other type of electronic storage medium that is located either internally or externally to the network controller 110, such as, for example, read-only memory (ROM), compact disc read-only memory (CDROM), electro-optical memory, magneto-optical memory, an electrically-erasable programmable read-only memory (EEPROM), or the like.

According to one embodiment, when computing device 104 moves physically from one location to another, an AP that services computing device 104 may change as well, and therefore it should be appreciated that the AP servicing computing device 104 at a given time is a good indicator of a general location of computing device 104, and even of the building/store/shopping place in which the user is located.

Figure 2:
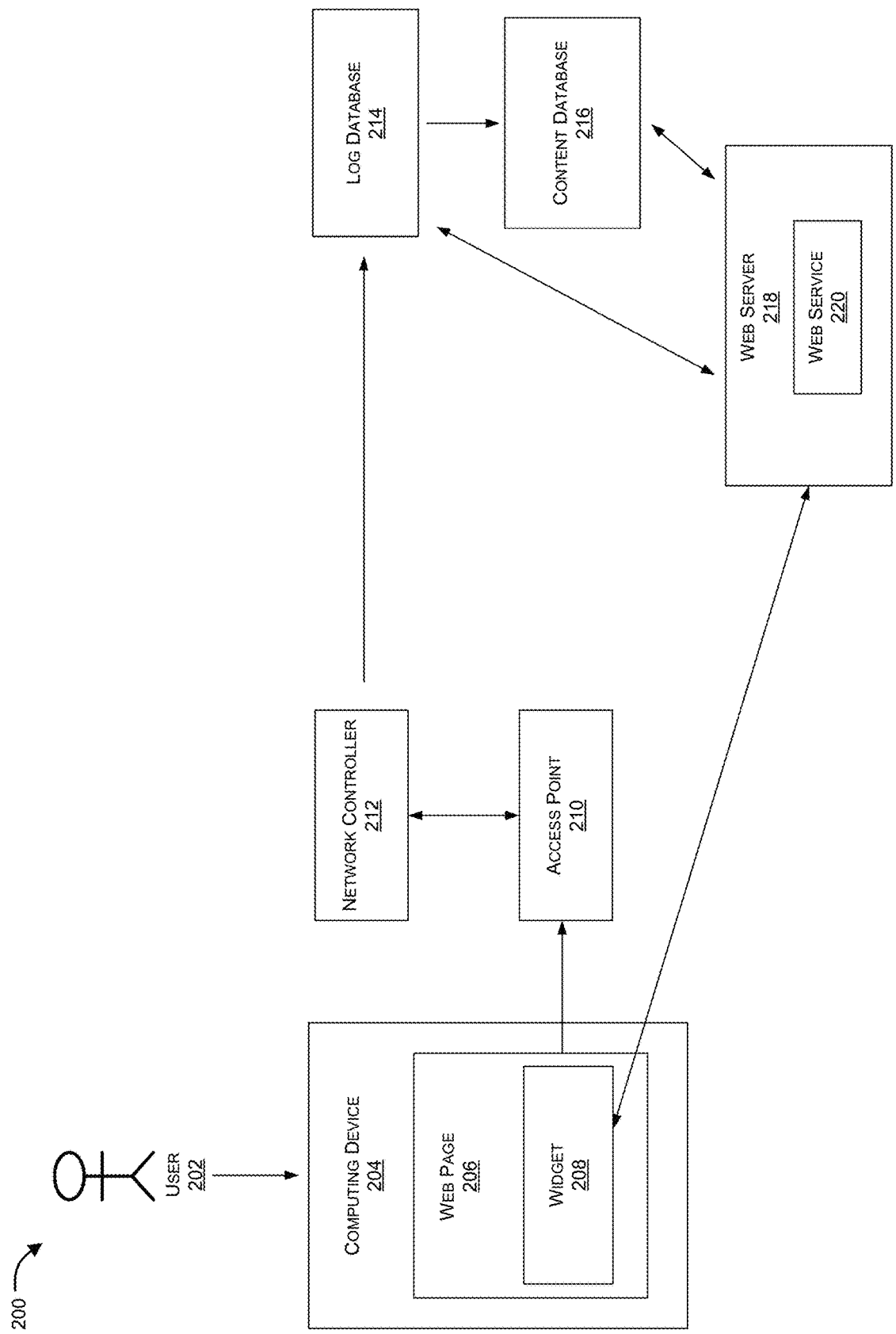
FIG. 2 illustrates another exemplary network architecture having a log database and a content database in which embodiments of the present invention can be implemented.

FIG. 2 illustrates another exemplary network architecture 200 having a log database 214 and a content database 216 in which embodiments of the present invention can be implemented. As in the case of FIG. 1, architecture 200 is completely exemplary in nature and various other suitable configurations can be implemented to enable AP location based content delivery.

In an aspect, architecture 200 can include a user 202 that browses through one or more web pages 206 on a browser that is configured in a computing device 204. Examples of such computing devices can include, like FIG. 1, laptops, mobile phones, smart phones, portable computing devices, Tablet PCs, PDAs, among other like devices. In an aspect, through a wireless interface card, for instance, computing device 204 can operatively couple with an AP 210 that is within range/closest/proximal/configured to be connected with device 204, wherein web resource requests (e.g., requests for web pages) can be sent from device 204 to AP 210 and then onward to a network controller 212 for transmission to the Internet.

According to one exemplary implementation, a system in accordance with the present disclosure can enable implementation of a web widget/small application 208 in one or more web pages 206, wherein widget 208 can be executed during presentation/rendering/requesting for web page 206 to enable calling of a web service 220 that is configured in a web server 218. In an aspect, widget 208 can be configured to send a unique identifier of computing device 204 to the called web service 220, wherein the unique identifier can include, but is not limited to an IP address or a MAC address of device 204. According to one embodiment, a lightweight widget configured by a network service provider/network hardware provider, or any other stakeholder can be incorporated by web page publishers who can add the widgets to their web pages. When a user is browsing the Internet, code placed in the widget can be configured to call a configured/defined web service by passing the unique identifier.

Using the unique identifier, web service 220 can, using log database 214, access one or more logs to identify an access point (AP) identifier of an AP that is currently servicing computing device 204. In an aspect, as described further below, log database 214 can store a mapping between unique identifiers (e.g., IP addresses, MAC addresses, an International Mobile Equipment Identity (IMEI) number, a Mobile Equipment Identifier (MEID), a Cellular Data Number (CDN), an Integrated Circuit Card ID (ICCID) number or a serial number) of computing devices and corresponding AP identifiers that are currently servicing/associated with the computing devices.

In an aspect, using the retrieved/identified AP identifier, web service 220 can be configured to access content database 216, which can be any repository/cloud server/database, and retrieve, from database 216, content that corresponds to the AP identifier, and then return the content back to computing device 206 for presentation on the web page. Such content can be, for instance, content that the owner of the premises where the AP is configured or where the user 202 is currently browsing for web pages 206, wishes to present to the user 202. In an aspect, the content can include but is not limited to informational content, advertisement content, product/service related content, or any other content that is configured to be displayed to users 202 that are serviced by specific APs 210. For instance, a first set of users that are connected to a first AP can be shown content that is specific to the first AP, and second set of users that are connected to a second AP can be shown content that is specific to the second AP, and so on. In such a case, when a user from the second set of users moves to a location that is serviced by the first AP, content specific to the first AP can be presented within web pages displayed to such a user.

Those skilled in the art will appreciate that embodiments of the present invention need not change the actual/desired content of the resource/web page requested by the user, but rather simply showing AP specific content in places/portions of web pages, for example, that are designated for additional/advertisement/supplemental content. For instance, a user may make a request for a news website page, which has one or more portions where advertisement can be displayed along with the actual news content. In such a case, when widget 208 that is implemented in the requested web page is executed, web service 220 that is called by widget 208, receives the unique identifier of the requesting computing device and uses the identifier to retrieve the AP identifier of AP 210 that is servicing computing device 204, based on which content specific to the AP identifier/AP 210 can be extracted from content database 216 and presented within the one or more portions of web page 206, for example, where advertisements would typically be displayed.

Figure 3:
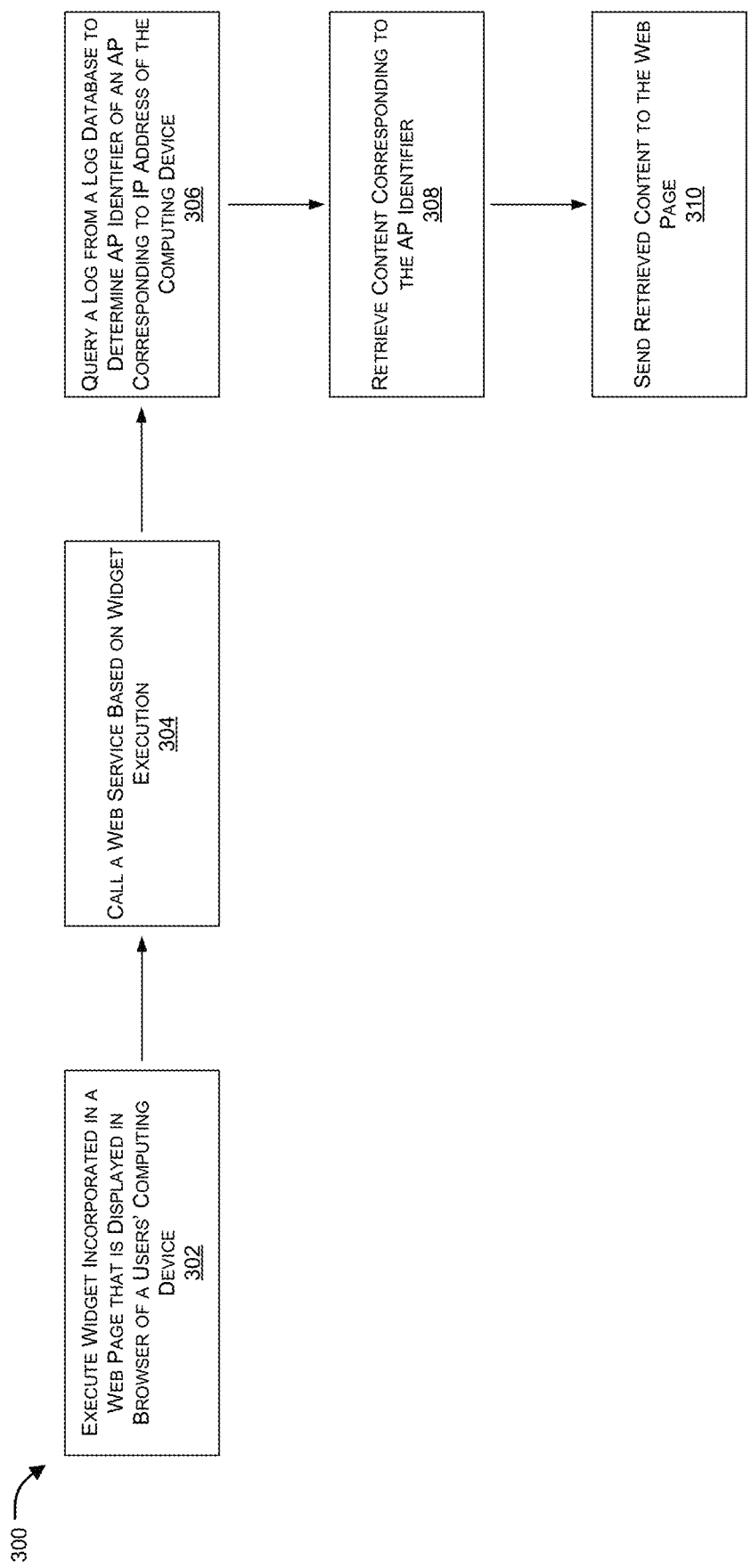
FIG. 3 illustrates a block diagram of an AP location based content presentation system in accordance with an embodiment of the present invention.

FIG. 3 illustrates a block diagram of an AP location based content presentation system 300 in accordance with an embodiment of the present invention. As shown, at block 302, a widget that is configured/incorporated within one or more web pages to be displayed in a browser of a computing device, can be executed. Based on such execution, at block 304, a web service can be called and the unique identifier of the requesting computing device (e.g., an IP address, a MAC address or other appropriate unique identifier) can be passed to the called web service. At block 306, the called web service can query a log from a log database using the unique identifier of the computing device to determine a AP identifier of an AP that is servicing the computing device. At block 308, the web service can retrieve content corresponding to the AP identifier from a content database. Finally, at block 310, the retrieved content can be incorporated within the web page requested by computing device within appropriate portions of the web page.

Figure 4:
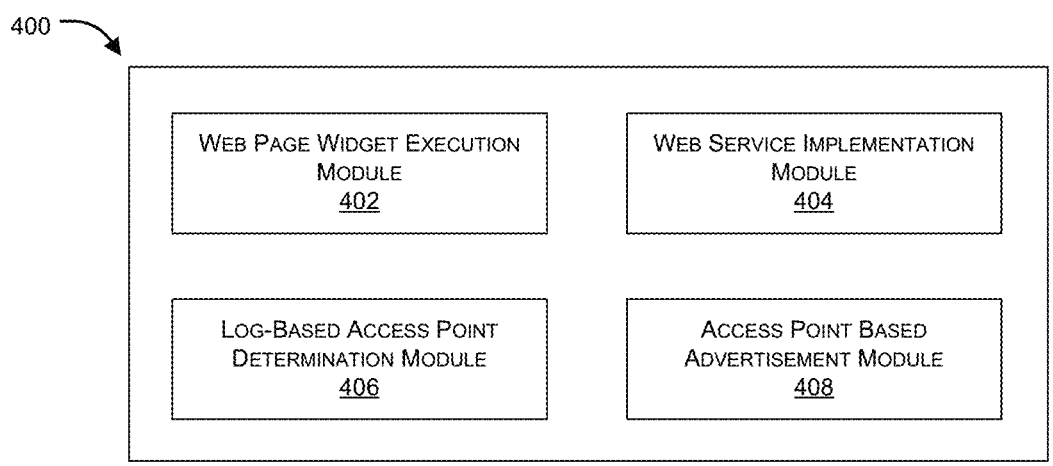
FIG. 4 illustrates exemplary functional modules of an AP location based content presentation system in accordance with an embodiment of the present invention.

FIG. 4 illustrates exemplary functional modules of an AP location based content presentation system 400 in accordance with an embodiment of the present invention. According to one embodiment, system 400 can include a web page widget execution module 402, a web service implementation module 404, a log-based access point determination module 406, and an access point based advertisement module 408.

Web page widget execution module 402 can be configured to execute a widget that is incorporated in a web page presented on a computing device. The widget can be configured as a small application that is embedded into the web page such that whenever the web page is loaded/presented/rendered, the embedded widget can be executed and a web service configured in the widget can be called. A widget can be defined as a portable chunk of code that can be installed and executed within a page without additional compilation, and may be implemented, for example, with dynamic HTML (DHTML), JavaScript, Asynchronous JavaScript, XML, AJAX and/or Adobe Flash, etc. Furthermore, a web widget can add content to a web page that is not static, and can provide additional functions to a web page. In an aspect, web widgets use and depend on web application program interfaces (APIs) exposed by the browser and/or by a widget engine.

Web service implementation module 404 can be configured to call a web service based on execution of the widget, wherein the web service can be configured to receive a unique identifier of the computing device and pass the unique identifier as part of a request to a log. In an aspect, the web service can be configured in a web server and execution of the widget can call a configured web service, which can receive the device identifier and then access a log database and one or more appropriate logs stored therein. In an aspect, the web server can be operatively coupled through a network with the computing device, and the web server can in turn be operatively coupled with a log database to enable the web service to query one or more logs stored in the log database. Those skilled in the art will appreciate that various other implementations are possible. For example, instead of using a web service, a remote API or a remote function call can be employed in alternative embodiments. In another embodiment, instead of a widget that is configured in a web page, the system can be configured to directly send the unique identifier to the web service responsive to the user connecting the computing device to Internet via the AP.

System 400 can further include a log-based access point (AP) determination module 406 that can be configured to enable the web service to, based on the log and the unique identifier, determine an AP identifier (e.g., a serial number) of the AP that is servicing the computing device. Module 406 therefore enables the called web service to access one or more appropriate logs of the log database that store the mapping between, for instance, IP addresses of computing devices and the AP identifiers of APs that are currently servicing such computing devices. In an aspect, the log can be modified in real time to reflect the precise and current status of the mapping between APs and computing device.

AP-based advertisement module 408 can be configured to enable the web service to retrieve content that is specific to the AP to be displayed on the web page. In an aspect, the content can be retrieved from a content database or any other configured repository that stored AP specific content and maps the exact content based on the AP identifier. Such content can, in an embodiment, be updated/modified by the owner/administrator of the AP, wherein the content can include any of an advertisement, information, deals and coupons that an owner of a premise within which the AP is installed desires to be presented to users of computing devices that are being serviced by the AP. In another aspect, the AP specific content can be configurable by a network administrator through a user interface.

System 400 can include a web server that can be configured to host the web service, wherein the web service can be called by any or a combination of the widget that is configured in the web page or by a third party, or a combination thereof.

In yet another aspect, the log can include a mapping between unique identifiers of computing devices and AP identifiers of APs servicing the computing devices that is created by a network controller and stored in a log database, wherein the web server can be operatively coupled with the log database and the content database. In an aspect, the log can be generated based on web-based actions that can be performed on the computing device.

In an aspect, system 400 does not rely upon browser cookies, and the data used is real time and accurate and more effective than conventional advertising models, which require browser cookies. Furthermore, using embodiments of the present disclosure, it is not required to scan webpages and perform indexing and hence, storage space and time is saved.

Figure 5:
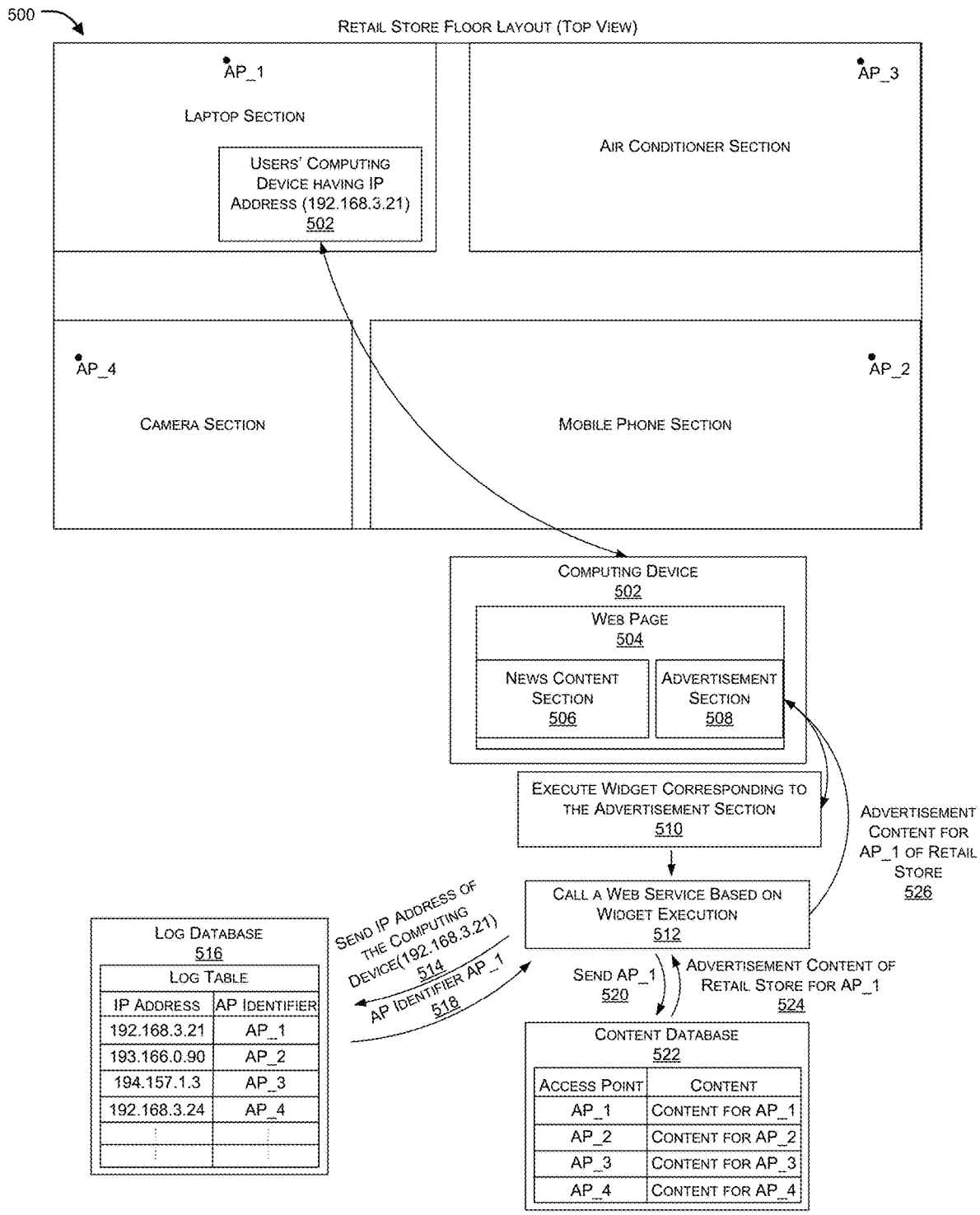
FIG. 5 illustrates an exemplary representation showing an AP location based content presentation system in operation in accordance with an embodiment of the present invention.

FIG. 5 illustrates an exemplary representation showing an AP location based content presentation system 500 in operation in accordance with an embodiment of the present invention. As shown, a user's computing device (e.g., mobile phone 502) having IP address 192.168.3.21 can, at time T1, be in the laptop section of an electronic store, wherein the store layout can include an air conditioner section, a camera section, and a mobile phone section, for instance. Each section can be serviced by an AP. For example, the laptop section may be serviced by AP_1 and the mobile phone section may be serviced by AP_2.

In an implementation, when a user attempts to use his/her mobile phone 502 to access a web page 504 relating to a news website, for example, the web page 504 can include, for instance, a news content section 506 and an advertisement section 508 such that a widget corresponding to the advertisement section configured in the web page can be executed at 510. At block 512, based on the widget execution, a web service can be called and IP address of the computing device 502 can be sent to the web service. The web service can then query a log database 516, which can include a mapping between the unique identifier of the computing device 502 and AP identifier of the AP that is currently servicing the computing device 502, which is AP_1 in the instant case. As can be seen from the first entry of the log table, the computing device 502 having the IP address as 192.168.3.21 has an AP identifier as AP_1. Based on the AP identifier, the web service can then refer to a content database 522 using a query 520, and retrieve content corresponding to the AP identifier AP_1. As shown, content for AP_1 can be retrieved from the database 522 and can be sent back to the web service as response 524, which in turn can return back the content to the computing device 502 as response 526 to be displayed in the advertisement section 508.

Figure 6:
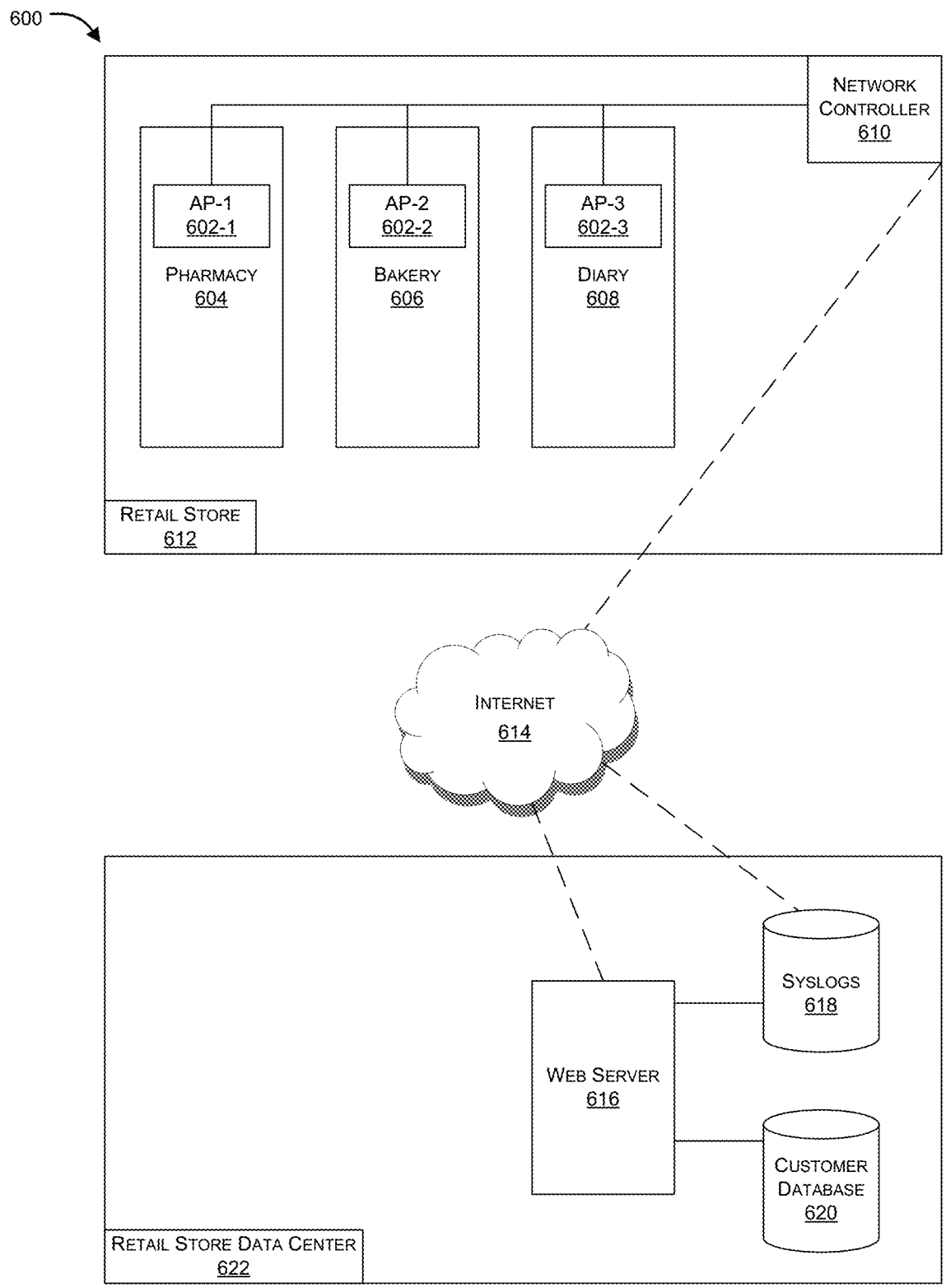
FIG. 6 illustrates an exemplary network architecture showing identification of an AP based on an IP address of a computing device, and retrieval of content that is specific to the identified AP in accordance with an embodiment of the present invention.

FIG. 6 illustrates an exemplary network architecture 600 showing identification of an AP based on a unique identifier (e.g., an IP address) of a computing device, and retrieval of content that is specific to the identified AP in accordance with an embodiment of the present invention. As shown, a retail store 612 can include a pharmacy section 604 that is serviced by AP-1 602-1, a bakery section 606 that is serviced by AP-2 602-2, and a diary section 608 that is serviced by AP-3 602-3, wherein all of the APs, which may be collectively referred to as APs 602 hereinafter, can be connected to a network controller 610. According to one embodiment, web request(s) from a computing device that is operatively coupled to an AP 602 can be sent through the controller 610 and Internet 614 to, for instance, a web server 616 that forms part of a retail store data center 622.

In an exemplary implementation, a web widget executed on a computing device operatively coupled with an AP can invoke a configured web service that forms part of the server 616, wherein the web service can use the unique identifier of the requesting computing device to first query a system log (syslog) 618 to determine the AP that is servicing the computing device, and then query a customer database 620 to extract content that is specific to the determined AP, to then return back the content to the computing device for display on the web page.

Figure 7:
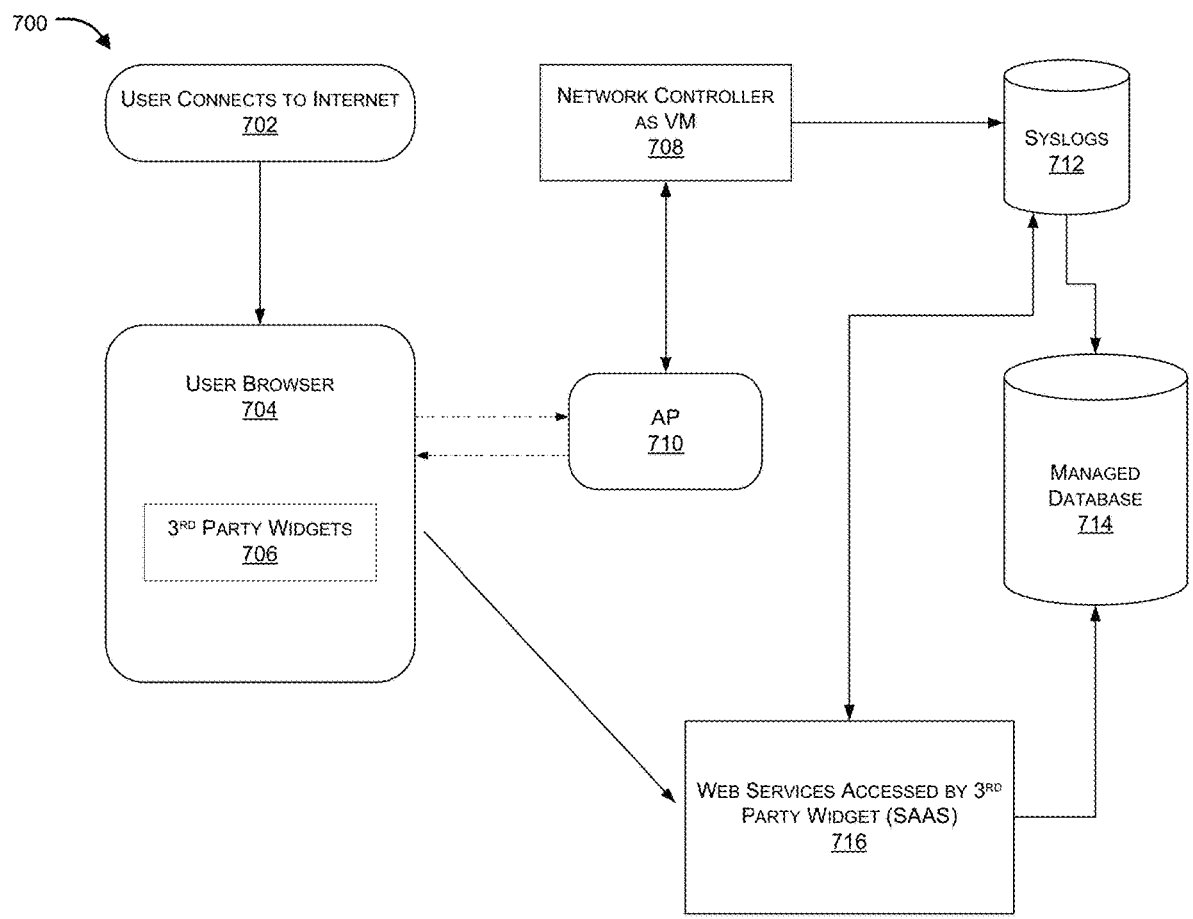
FIG. 7 illustrates another exemplary network architecture showing identification of an AP based on an IP address of a computing device, and retrieval of content that is specific to the identified AP in accordance with an embodiment of the present invention.

FIG. 7 illustrates another exemplary network architecture 700 showing identification of an AP based on a unique identifier (e.g., an IP address) of a computing device, and retrieval of content that is specific to the identified AP in accordance with an embodiment of the present invention. As shown, at block 702, a user can connect to Internet through an AP 710 and a network controller 708 that can be configured as a virtual machine (VM). In an aspect, requests from the user can be issued using a browser 704 that is configured in a computing device of the user, and can enable execution of a third party widget 706. Such execution of the widget 706 can invoke/call a defined web service that can be accessed by the third party widget as a software-as-a-service (SAAS) 716, wherein the web service can query a syslog 712 to determine, using a unique identifier of the requesting computing device, AP identifier of the AP that is currently servicing the computing device, using which AP identifier, the web service can then query a managed database/content database 714 to determine AP specific content using the AP identifier and return the AP specific content to the user browser 704. In the instant approach, a customer (e.g., a store owner) can install an AP in his/her premises, and a sophisticated rich UI can be developed by a network vendor/AP vendor and given to the customer to add custom information (e.g., advertisements, deals, coupons, preventive care information etc.) to be associated with the AP in a customer database. A location of the AP can then be identified by multiple ways such as the cloud or provided by the customer during AP installation process. Network controller's VMs can be installed in the cloud and the generated sys-logs can be stored in a managed data center, for instance. Web services can be developed and exposed to advertisement network providers, who can use the web service by passing IP address as request parameter. Web service can also be configured to check for matching IP address and retrieve AP from sys-logs, and then the advertisement related to AP can be fetched from customer database and sent as response. In this approach, the web services developer can expose the web services as Software as a Service model or pay as go model and advertisement network providers have the choice to use their existing widgets already published in web pages.

Figure 8:
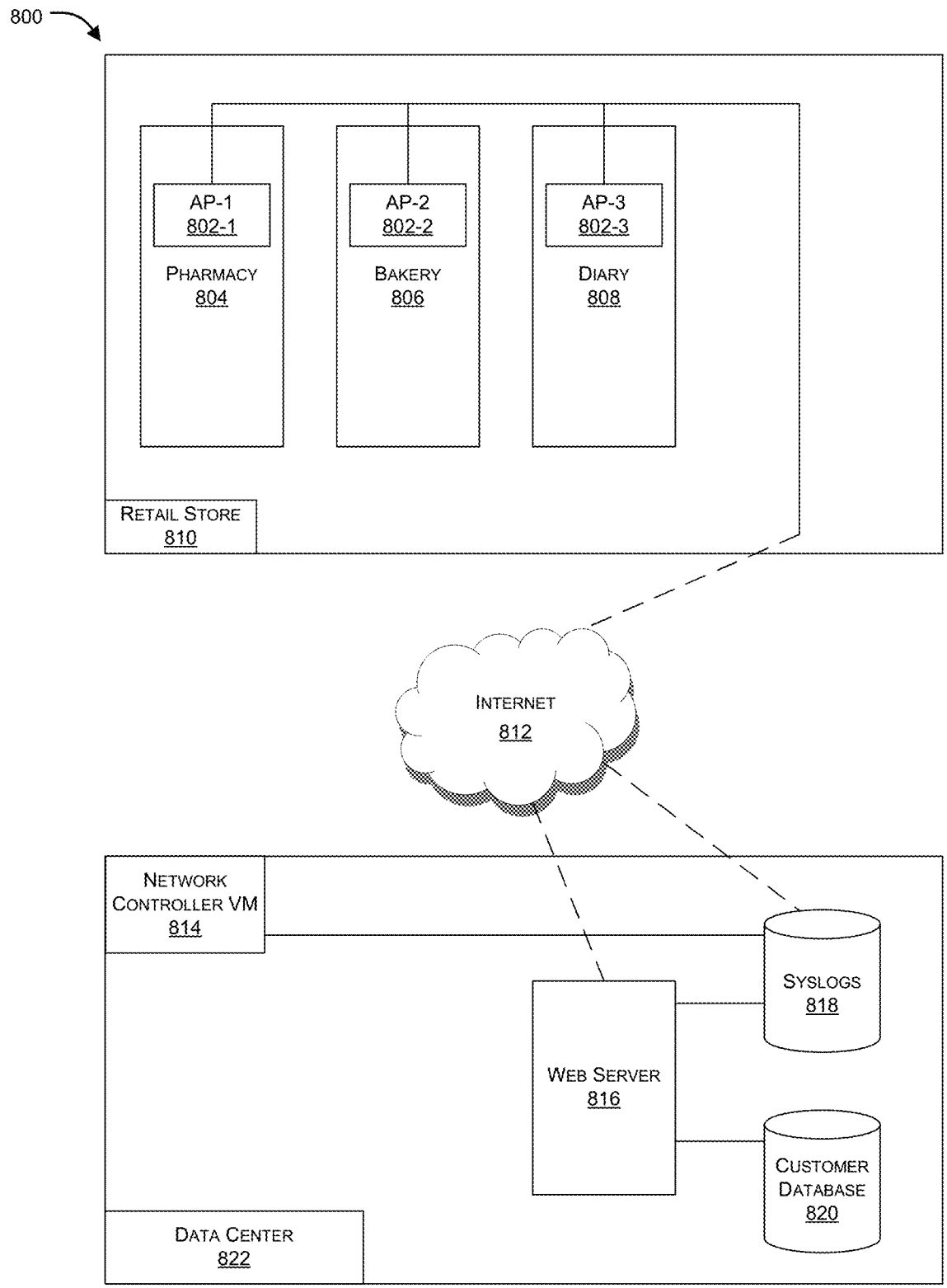
FIG. 8 illustrates yet another exemplary network architecture showing identification of an AP based on an IP address of a computing device, and retrieval of content that is specific to the identified AP in accordance with an embodiment of the present invention.

FIG. 8 illustrates yet another exemplary network architecture 800 showing identification of an AP based on a unique identifier (e.g., an IP address) of a computing device, and retrieval of content that is specific to the identified AP in accordance with an embodiment of the present invention. As shown, a retail store 810 can include a pharmacy section 804 that is serviced by AP-1 802-1, a bakery section 806 that is serviced by AP-2 802-2, and a diary section 808 that is serviced by AP-3 802-3, wherein all the APs, which may be collectively referred to as APs 802 hereinafter, can be connected to a network controller 814 through Internet 812, wherein the network controller 814 is configured as a virtual machine (VM) that is part of data center 822. According to one embodiment, web request(s) from a computing device that is operatively coupled to an AP 802 can be sent through the Internet 812 to the controller 814 and/or to, for instance, a web server 816 that forms part of the data center 822.

In an exemplary implementation, a web widget that is executed on a computing device operatively coupled with an AP 802 can invoke a configured web service that forms part of the server 816, wherein the web service can use unique identifier of the requesting computing device to first query a system log (syslog) 818 to determine the AP that is servicing the computing device, and then query a customer database 820 to extract content that is specific to the determined AP, to then return back the content to the computing device for display on the web page.

Figure 9:
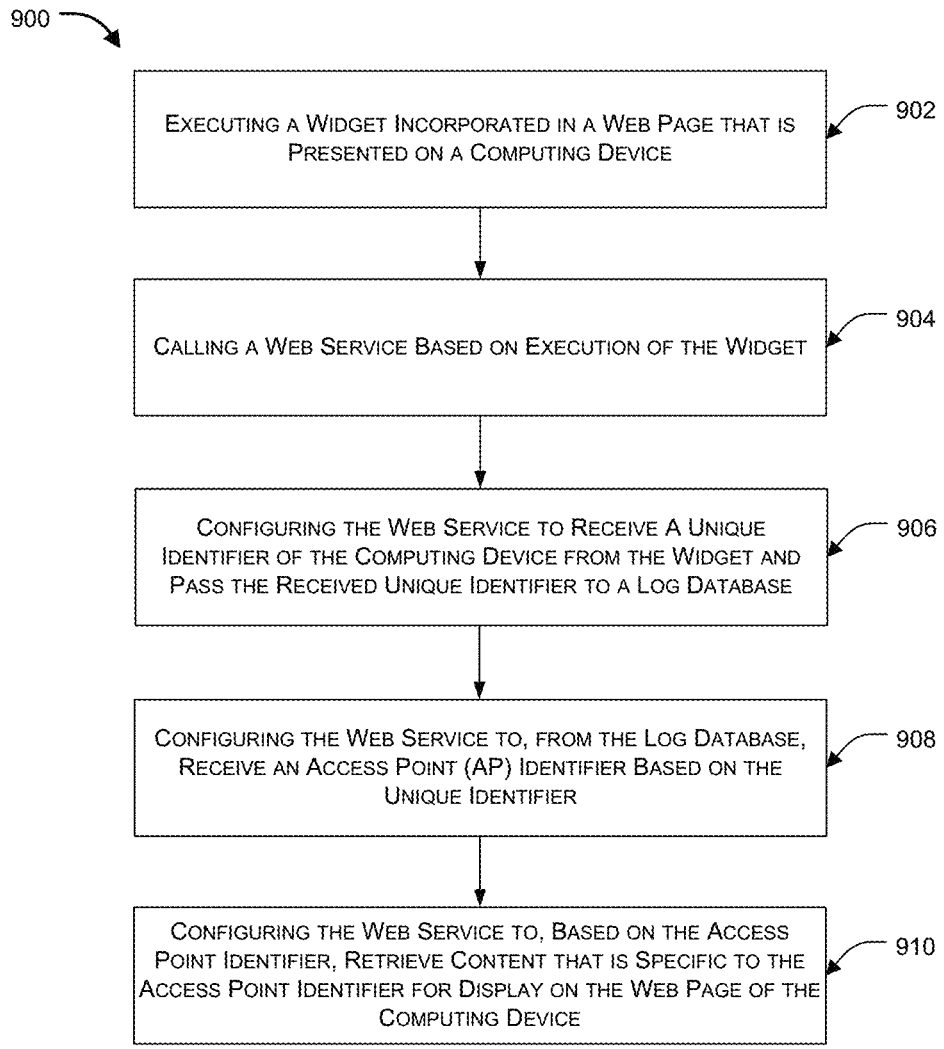
FIG. 9 illustrates an exemplary flow diagram showing AP location based content presentation processing in accordance with an embodiment of the present invention.

FIG. 9 illustrates an exemplary flow diagram 900 showing AP location based content presentation processing in accordance with an embodiment of the present invention. In an aspect, the method can include the steps of, at 902, executing a widget incorporated in a web page that is presented on a computing device, and at 904, calling a web service based on execution of the widget. At step 906, the web service can be configured to receive a unique identifier of the computing device and pass the received unique identifier as part of a request to a log. At step 908, the web service can, based on the log and the unique identifier, determine an access point (AP) identifier of an AP that is servicing the computing device. At step 910, the method can include the step of enabling the web service to retrieve content that is specific to the AP to be displayed on the web page.

Figure 10:
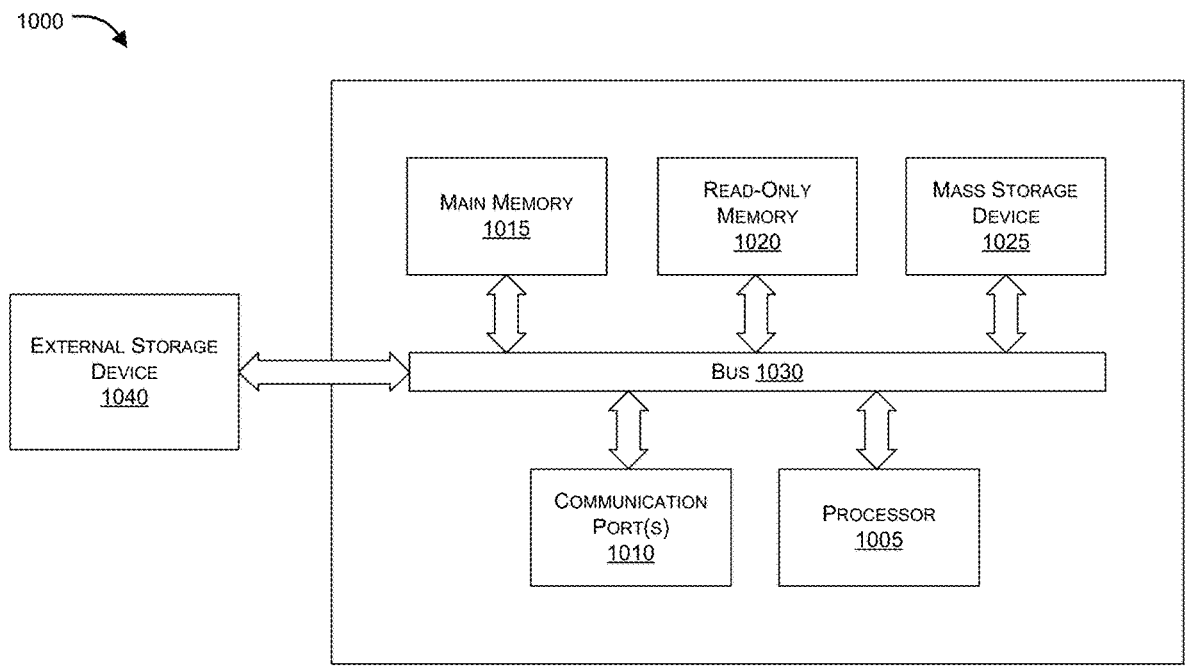
FIG. 10 is an exemplary computer system in which or with which embodiments of the present invention may be utilized.

FIG. 10 is an example of a computer system 1000 with which embodiments of the present disclosure may be utilized. Computer system 1000 may represent or form a part of a network controller (e.g., network controller 110, 212, 610, 708 or 814), an AP (e.g., AP 108, 210, 602, 710 or 802), a log database (e.g., log database 214, 516, 618, 712 or 818), a content database (e.g., content database 216, 522, 620, 714 or 820) and/or a web server (e.g., server 114, 218, 616 or 816).

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 1000 includes a bus 1030, a processor 1005, communication port 1010, a main memory 1015, a removable storage media 1040, a read only memory 1020 and a mass storage 1025. A person skilled in the art will appreciate that computer system 1000 may include more than one processor and communication ports.

Examples of processor 1005 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1005 may include various modules associated with embodiments of the present invention.

Communication port 1010 can be any of an RS-232 port for use with a modem based dialup connection, a 10/100 Ethernet port, a Gigabit or 10 Gigabit port using copper or fiber, a serial port, a parallel port, or other existing or future ports. Communication port 1010 may be chosen depending on a network, such a Local Area Network (LAN), Wide Area Network (WAN), or any network to which computer system 1000 connects.

Memory 1015 can be Random Access Memory (RAM), or any other dynamic storage device commonly known in the art. Read only memory 1020 can be any static storage device(s) such as, but not limited to, a Programmable Read Only Memory (PROM) chips for storing static information such as start-up or BIOS instructions for processor 1005.

Mass storage 1025 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1030 communicatively couples processor(s) 1005 with the other memory, storage and communication blocks. Bus 1030 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1005 to system memory.

Optionally, operator and administrative interfaces, such as a display, keyboard, and a cursor control device, may also be coupled to bus 1030 to support direct operator interaction with computer system 1000. Other operator and administrative interfaces can be provided through network connections connected through communication port 1010.

Removable storage media 1040 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A computer-implemented method for obtaining location-specific content for presentation on a wireless computing device operating within a wireless local area network (WLAN) of an enterprise, based on a location in a building determined from logs of AP wireless local area network (WLAN) activity, the method comprising:

maintaining, by a WLAN controller that manages a plurality of wireless access points (APs) at different locations of the WLAN within the building, a log database containing information a section of a plurality of sections of the building where each of the plurality of APs is located, and maintaining a mapping of identifiers of the plurality of APs to corresponding unique identifiers of a plurality of wireless computing devices operating within the WLAN that are being serviced by the plurality of APs by observing network activity by the plurality of wireless computing devices and identifying which of the plurality of APs are servicing requests on behalf of which of the plurality of wireless computing devices;

facilitating location-based content delivery to the plurality of wireless computing devices as they move from one section of the building to a different section of the building by maintaining a content database containing information mapping each of the identifiers of the plurality of APs to a set of location-specific content corresponding to a current section for display to the plurality of wireless computing devices based on respective locations of the plurality of wireless computing devices as determined by respective APs of the plurality of APs that are providing Internet access on behalf of the plurality of wireless computing devices, while in the current section;

transmitting, by an AP of the plurality of APs, a request for a web page originated from a wireless computing device of the plurality of wireless computing devices, wherein the web page supports location-based content delivery by including a widget located within a portion of display of a web page associating with the web service;

responsive to receipt of the web page by a browser of the wireless computing device, executing by the browser, the widget to obtain the location-specific content to be displayed within the web page based on a location of the wireless computing device within the enterprise by obtaining, by the widget, a device unique identifier of the wireless computing device and invoking, by the widget, the web service and passing as a parameter to the web service the device unique identifier, wherein the web service has access to both the log database and the content database;

responsive to receipt of the device unique identifier, determining, by the web service from the log database, an AP unique identifier of the AP servicing the wireless computing device by querying the log database with the device unique identifier;

retrieving, by the web service from the content database, content contingent upon which of the plurality of APs the wireless computing device is connected by utilizing the AP unique identifier as an index to current device location; and transmitting, by the web service, the location-specific content to be displayed within the widget on the web page on the web browser of the wireless computing device, and non-location-specific content to be displayed outside of the widget, and wherein a location of the AP within the enterprise is used as an indicator of the location of the wireless computing device.

* * * * *